(12) United States Patent
Lambert (10) Patent No.: US 11,919,269 B2
(45) Date of Patent: Mar. 5, 2024

(54) SCREW FEEDER

(71) Applicant: VALMET AB, Sundsvall (SE)

(72) Inventor: Francois Lambert, Sundsvall (SE)

(73) Assignee: VALMET AB, Sundsvall (SE)

( * ) Notice: Subject to any disclaimer, the term of this patent is extended or adjusted under 35 U.S.C. 154(b) by 539 days.

(21) Appl. No.: 17/270,929

(22) PCT Filed: Jun. 14, 2019

(86) PCT No.: PCT/SE2019/050561
§ 371 (c)(1),
(2) Date: Feb. 24, 2021

(87) PCT Pub. No.: WO2020/046186
PCT Pub. Date: Mar. 5, 2020

(65) Prior Publication Data
US 2021/0206131 A1 Jul. 8, 2021

(30) Foreign Application Priority Data
Aug. 31, 2018 (SE) .................................... 1851033-9

(51) Int. Cl.
*B30B 9/26* (2006.01)
*B30B 9/12* (2006.01)
(Continued)

(52) U.S. Cl.
CPC ................ *B30B 9/26* (2013.01); *B30B 9/121* (2013.01); *B65G 33/14* (2013.01); *B65G 33/26* (2013.01); *D21C 7/06* (2013.01); *D21C 9/18* (2013.01)

(58) Field of Classification Search
CPC .. B30B 9/26; B30B 9/121; B30B 9/12; B30B 9/122; B65G 33/14; B65G 33/26; B65G 33/24; D21C 7/06; D21C 9/18
See application file for complete search history.

(56) References Cited

U.S. PATENT DOCUMENTS 3,478,679 A * 11/1969 Bauserman ............. B30B 9/122
100/150
4,199,263 A * 4/1980 Menges ................ B29C 48/395
366/90
(Continued)

FOREIGN PATENT DOCUMENTS

CN 202895729 U 4/2013
DE 178929 C 7/1904
(Continued)

OTHER PUBLICATIONS

Extended European Search Report, Application No. 19854555.0, dated Feb. 16, 2022, 12 pages.

*Primary Examiner* — Jimmy T Nguyen
(74) *Attorney, Agent, or Firm* — Foley & Lardner LLP (57) ABSTRACT

A screw feeder includes a pipe, feed screw, rotatory shaft, dewatering holes, anti-rotation bars extending inside the pipe and protruding towards the feed screw, an inlet to receive solid-liquid mixture, and an outlet to discharge partially dewatered solid. The pipe includes at least one pipe section having a first peripheral zone in a vertically lower area with dewatering holes but no anti-rotation bars and a second peripheral zone in a vertically upper area with anti-rotation bars. A pipe profile includes two differently shaped profiles, a first and second pipe profile are selected from a square-shaped, partly circular, and a partly elliptically-shaped profile. The first pipe profile is selected to enable outer edges of the feed screw to remove material overlying the dewatering holes, and the second pipe profile is selected to prohibit contact between the outer edges of the feed screw and the anti-rotation bars.

9 Claims, 8 Drawing Sheets (51) Int. Cl.
*B65G 33/14* (2006.01)
*B65G 33/26* (2006.01)
*D21C 7/06* (2006.01)
*D21C 9/18* (2006.01)

(56) References Cited

U.S. PATENT DOCUMENTS

| | | | |
|---|---|---|---|
| 5,558,203 | A | 9/1996 | Herm et al. |
| 2006/0196370 | A1* | 9/2006 | Kraft ..................... B30B 9/122 |
| | | | 100/117 |
| 2016/0067637 | A1 | 3/2016 | Roiss et al. |

FOREIGN PATENT DOCUMENTS

| | | | |
|---|---|---|---|
| FR | 857282 | A | 9/1940 |
| GB | 2230788 | A | 10/1990 |
| JP | 63-076795 | A | 4/1988 |
| JP | 6376795 | A | 4/1988 |
| JP | 10-129827 | A | 5/1998 |
| JP | 2003-126900 | A | 5/2003 |
| WO | WO-92/13710 | A1 | 8/1992 |
| WO | WO-2009/005441 | A1 | 1/2009 |

* cited by examiner

SCREW FEEDER

TECHNICAL FIELD

The proposed technology generally relates to a screw feeder for transporting material, and relates in particular to a screw feeder for the transport of granular material. Embodiments of the proposed technology provides a plug screw feeder for the transport and compression of granular material such as wood chips

BACKGROUND

Screw feeders, such as plug screw feeders, are widely used in the processing of pulp to transport wood chips or other raw materials, such as e.g., sawdust, bagasse or straw, from one part of the pulping process to another. A screw feeder is however not only used for conveying and feeding chips in a pulping process, it can also be used to dewater the wood chips. When using a screw feeder for the feeding of granular materials such as wood chips, a number of problems can arise. A particular problem is when the compressed chips, which have filled a pocket in the rotor, i.e. the feed screw of the screw feeder, are sheared and start to co-rotate together with the feed screw instead of being transported in the forward direction as intended. To overcome these problems and also to provide energy-efficient and wear-resistant screw feeders, many different designs have been suggested and used. One design that has been used to at least counter parts of the co-rotation problem uses anti-rotation bars that are provided on the inner surface of the pipes housing or enclosing the feed screw. The purpose of these anti-rotation bars is to prohibit the wood chips from co-rotating with the feed screw. A screw feeder may, as was mentioned above, also support the dewatering of e.g., the wood chips. A particular screw feeder design that enables dewatering is provided with dewatering holes in the lower section of the pipe housing the feed screw. The action of the feed screw along with the pressure applied on the wood chips will separate water from the wood chips. By providing dewatering holes in the lower section the water is allowed to escape the screw feeder through these holes. Despite the substantial efforts that has been invested in designing screw feeders there is still a need to improve the degree of dewatering, especially in the pulp industry, while also providing mechanisms that reduces the risks of shearing and co-rotation.

SUMMARY

It is an object to provide a screw feeder having an improved dewatering efficiency while at the same time reducing the risks of shearing and co-rotation.

It is another object to provide a plug screw feeder with improved dewatering efficiency that reduces the risks of shearing and co-rotation.

It is an additional object of the proposed technology to provide a pipe design that can be used in a screw feeder with improved dewatering efficiency and reduced shearing and co-rotation.

These and other objects are met by embodiments of the proposed technology.

According to an aspect of the proposed technology, there is provided a screw feeder comprising a pipe enclosing a feed screw provided on a rotatory shaft running parallel with the length direction of the pipe. The pipe further comprising a number of dewatering holes, a number of anti-rotation bars provided on, and extending along, the inside of the pipe, the anti-rotation bars protruding in a direction towards the feed screw, an inlet for receiving a solid-liquid mixture arranged at a first end of the pipe, and an outlet arranged at a second end of the pipe for discharging an at least partially dewatered solid from the pipe. The pipe includes at least one longitudinal pipe section having a first peripheral zone provided in the vertically lower area of the longitudinal pipe section and provided with dewatering holes but no anti-rotation bars, and a second peripheral zone provided in the vertically upper area of the longitudinal pipe section and provided with anti-rotation bars. The overall pipe profile of the pipe section is composed of two differently shaped pipe profiles, a first pipe profile and a second pipe profile. The first pipe profile defines the shape of the first peripheral zone and is a profile selected from a square shaped profile, a profile having a partly circular cross-section with a squashed end or a circle segment removed or a partly elliptically shaped profile. The second pipe profile defines the shape of the second peripheral zone (90), and the shape of the first pipe profile is selected to enable the outer edges of the feed screw to remove material overlying the dewatering holes, and the shape of the second pipe profile is selected so as to prohibit any contact between the outer edges of the feed screw and the anti-rotation bars.

According to another aspect of the proposed technology there is provided a pipe to be used in a screw-feeder, according to the first aspect. The pipe comprises an inlet for receiving a solid-liquid mixture and an outlet arranged at an opposite end of the pipe, relative the inlet, for discharging an at least partially dewatered solid from the pipe. The pipe comprises at least one longitudinal pipe section having a first peripheral zone provided with dewatering holes and a second peripheral zone provided with anti-rotation bars, the overall pipe profile of the pipe section being composed of two differently shaped pipe profiles, a first pipe profile and a second pipe profile, the first pipe profile defining the shape of the first peripheral zone and the second pipe profile defining the shape of the second peripheral zone, where the shape of the first pipe profile is selected from a square shaped profile or a profile having a partly circular cross-section with a squashed end or a circle segment removed, and the shape of the second pipe profile is a circularly shaped pipe profile.

Embodiments of the proposed technology enables a more efficient separation of liquid from the liquid-solid mixture due to the fact that already separated liquid can be removed from the pipe even in those cases where the liquid-solid mixture tends to plug the dewatering holes. Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For a better understanding of the proposed technology, it may be useful to begin with a brief system overview and/or analysis of the technical problem. To this end reference is made to FIG. 1.

Figure 1:
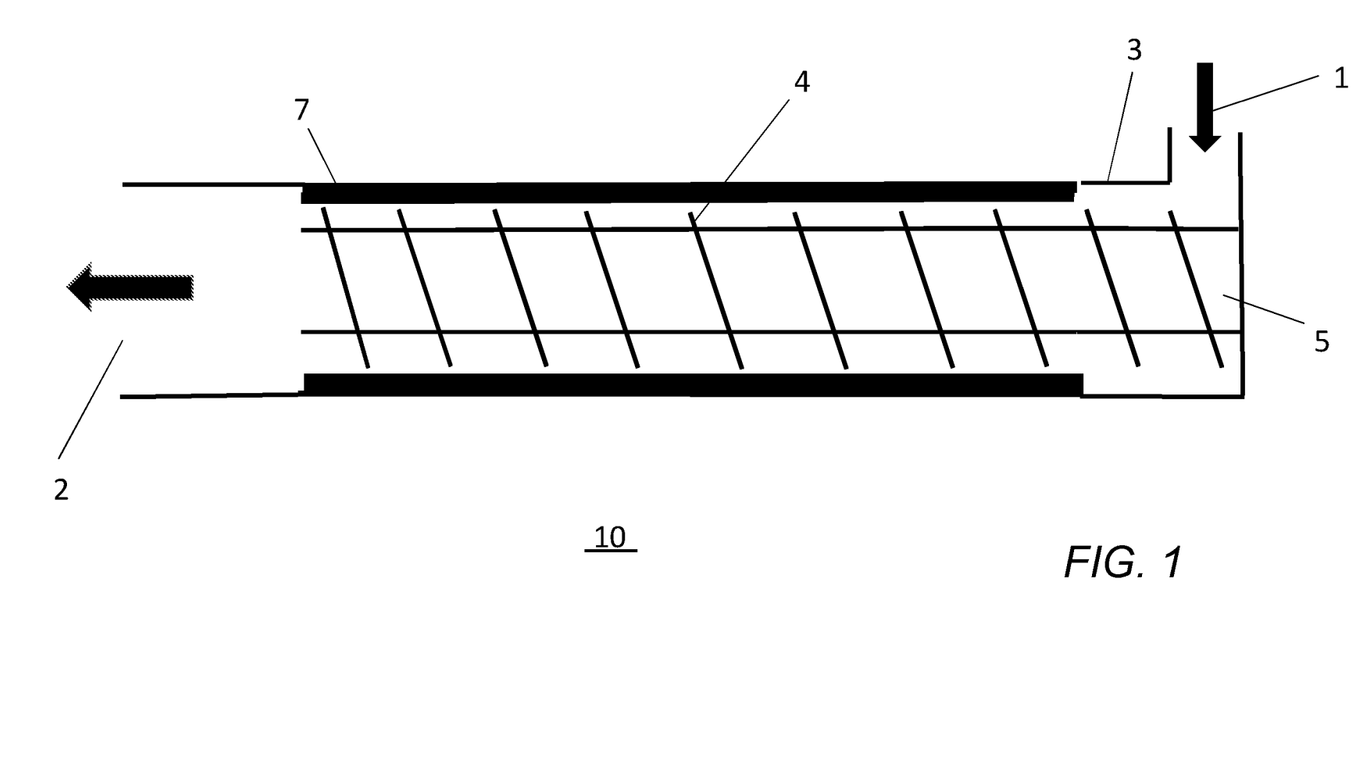
FIG. 1 is a schematic illustration of a side view of a screw feeder in which the proposed technology may be implemented.

In FIG. 1 there is shown a schematic illustration of a lengthwise cross-section of a screw feeder 10 in which the proposed technology can be implemented. The screw feeder 10 comprises a pipe 3 enclosing a rotatory shaft 5 that is arranged, e.g., centrally in the pipe 3. The rotatory shaft 5 is provided with a feed screw 4. One of the ends of the shaft 5, e.g., the end illustrated by the dashed line is adapted to be connected to an external drive, e.g., an electrical motor 8, in order to rotate the shaft and thus the feed screw 4. The pipe 3 is also provided with a number of anti-rotation bars 7 that are arranged on, and extending along, the inside of the pipe 3 in such a way that the anti-rotation bars 7 protrudes in a direction towards the feed screw 4. Note that there are only shown two anti-rotation bars 7 in FIG. 1, normally the pipe 3 would be provided with a number of anti-rotation bars 7 that are evenly distributed along the inside surface of the pipe 3. The purpose of the anti-rotation bars is to prohibit that any feeding material to co-rotate, i.e., rotate along, with the feed-screw 4. In order to achieve this purpose the anti-rotation bars 7 have to have an extension towards the feed screw that is long enough so as to create a small gap between the anti-rotation bars 7 and the feed screw 4. The screw feeder also comprises an inlet 1 arranged at a first end of the pipe 3. The inlet is adapted for receiving a solid-liquid mixture, such as, for example, a mixture of biomass and water. The screw feeder further comprises an outlet 2 that is arranged at a second end of the pipe 3. The outlet is adapted to discharge the solid-liquid mixture, preferably in a state where a substantial amount of liquid has been separated and removed from the solid material. In order to achieve such a separation it is possible to provide the pipe 3 with a number of dewatering holes, not shown in FIG. 1. The dewatering holes are preferably provided in a specific dewatering zone of the pipe 3, this dewatering zone may be provided on the vertical lower part of the pipe 3. During use of the screw feeder 10 a liquid containing material is fed into the screw feeder through the inlet 1. The action of the rotatory shaft 5 on the feed screw 4 will push the material forward. The anti-rotation bars 7 provided on the inside surface of the pipe, i.e., on the surface facing the feed screw 4, prohibits the material from rotating along with the feed-screw. The action of the feed-screw 4 will therefore mainly translate the material and do not rotate the same, at least not in any substantial manner. The impact or contact between the feed screw 4 and the input material will cause a partial separation between the liquid content and the solid content of the input material. The pipe 3 may in addition be highly pressurized in order to further increase the separation of the input material into liquid content and solid content. The liquid may then be removed from the pipe 3 through the dewatering holes mentioned above. In the end of the process at least a partially de-liquified or dewatered material is discharged from the screw feeder 10 at the outlet 2.

A particular draw-back with an arrangement as described by FIG. 1 is that part of the material that is translated from the inlet 1 to the outlet 2 may, despite the presence of the anti-rotation bars 7, find its way towards the section of the pipe 3 that contains the dewatering holes. It is thus possible that this material will plug or at least cover the dewatering holes and thus prohibit the removal of the liquid from the pipe 3. The proposed technology aims to provide mechanisms that at least alleviates the problems with plugged dewatering holes.

Figure 2:
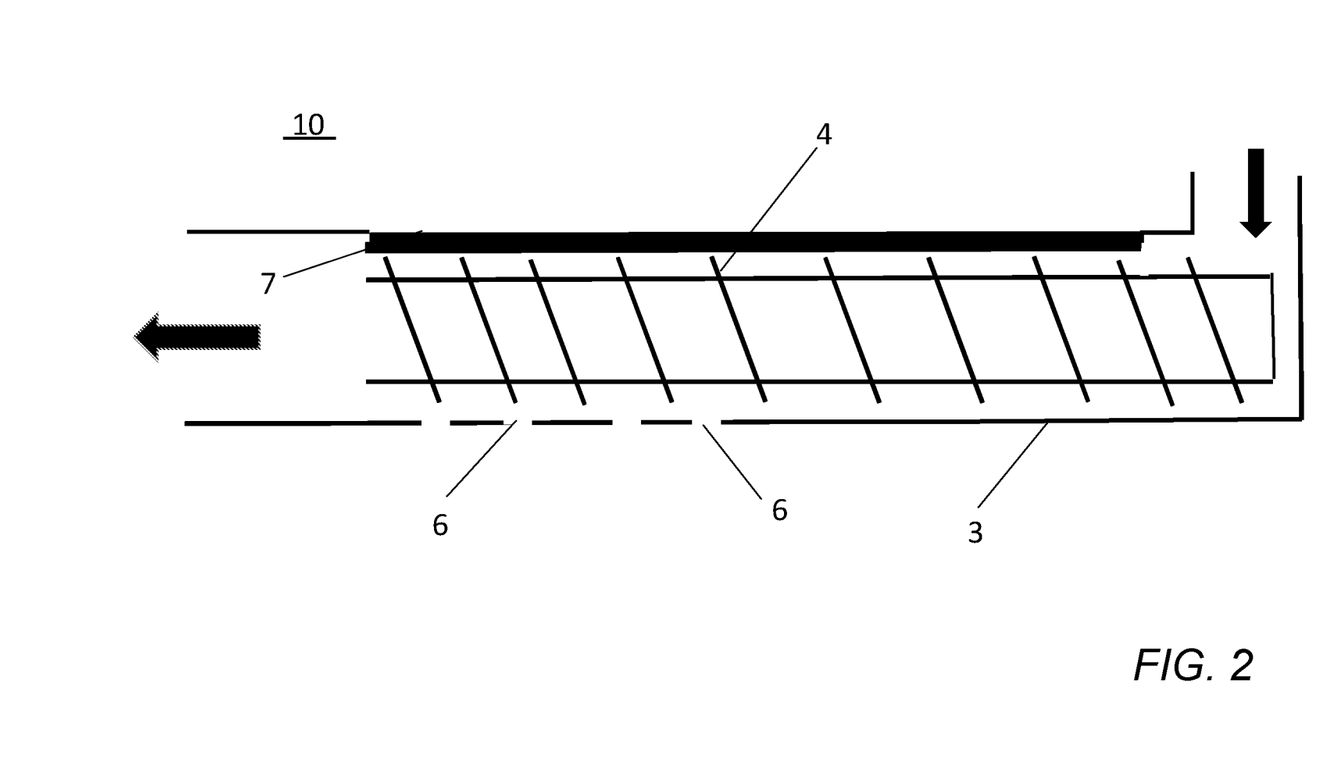
FIG. 2 is a schematic illustration of a side view of a screw feeder.

The proposed solution to the problem with plugging of the dewatering holes is to provide a pipe 3 that has an overall shape that enables the outer ends of the feed-screw 4 to reach the area of the dewatering holes. If the outer ends of the feed screw 4 reaches the dewatering holes, the rotatory motion of the feed screw will remove any material overlying the dewatering holes. This is however not possible with known screw feeders due to the anti-rotation bars 7 provided on the pipe 3. The anti-rotation bars 7 needs to extend towards the feed screw 4 so that a sufficiently small distance is created between the anti-rotation bars and the outer edges of the feed-screw. This distance determines the smallest possible distance between the feed-screw 4 and the dewatering holes in a regular symmetrical pipe. If the distance between the feed-screw and the dewatering holes is smaller than the distance between the anti-rotation bars and the outer edges of the feed-screw the feed-screw 4 will be brought in contact with the anti-rotation bars 7. FIG. 2 provides an illustration of the situation when the anti-rotation bars 7 have been removed from the part of the pipe 3 where the dewatering holes 6 are provided. It can be seen that the outer edges of the feed screw 4 are not able to reach the inside surface of the pipe 3 where the dewatering holes are provided. In order to overcome the mutually non-compatible constraints that the feed screw 4 should reach the area of the dewatering holes and at the same time not collide with any anti-rotation bars 7 provided on the inner surface of the pipe 3 the proposed technology offers a solution that is based in part on an asymmetrical pipe 3. Additional features are that certain peripheral zones of the pipe are assigned to carry the anti-rotation bars 7 while a specific peripheral zone is dedicated for the dewatering holes. The asymmetry of the pipe 3 will be used to provide the pipe 3 with a particular pipe profile, P2, on those zones that carry the anti-rotation bars 7, and a different pipe profile, P1, in the zone that is provided with dewatering holes. The pipe profile P2 on those zones that carry the anti-rotation bars 7 will have a shape that ascertain that there is no contact between the anti-rotation bars 7 and the outer edges of the feed screw, while the pipe profile P1 in the zone that is provided with dewatering holes will have a shape that enables the outer edges of the feed screw to reach close to the inside surface of the pipe in order to enable a removal of material overlying the dewatering holes by the outer edges of the feed screw. The outer edges of the feed screw will thus be able to sweep away any material that overlies the dewatering holes 6.

The proposed technology thus aims to alleviate at least some of the drawbacks in the in the field of screw feeders by providing a screw feeder 10 that comprises a pipe 3 enclosing a feed screw 4 provided on a rotatory shaft 5 running parallel with the length direction of the pipe 3. The pipe 3 further comprises a number of dewatering holes 6 and a number of anti-rotation bars 7 provided on, and extending along, the inside of the pipe 3, the anti-rotation bars 7 protruding in a direction towards the feed screw 4. The pipe 3 further comprises an inlet 1 for receiving a solid-liquid mixture arranged at a first end of the pipe 3 and an outlet 2 arranged at a second end of the pipe 3 for discharging an at least partially dewatered solid from the pipe 3. The pipe 3 comprises at least one longitudinal pipe section 31 having a first peripheral zone 9 provided in the vertically lower area of the longitudinal pipe section 31 and provided with dewatering holes 6 but no anti-rotation bars 7, and a second peripheral zone 90 provided in the vertically upper area of the longitudinal pipe section 3 and being provided with anti-rotation bars 7. The overall pipe profile of the pipe section 31 is composed of two differently shaped pipe profiles, a first pipe profile P1 and a second pipe profile P2. The first pipe profile P1 defines the shape of the first peripheral zone 9 and is a profile selected from a square shaped profile, a profile having a partly circular cross-section with a squashed end or a circle segment removed or a partly elliptically shaped profile, and the second pipe profile P2 defines the shape of the second peripheral zone 90. The shape of the first pipe profile P is selected to enable the outer edges of the feed screw 4 to remove material overlying the dewatering holes 6, and the shape of the second pipe profile P2 is selected so as to prohibit any contact between the outer edges of the feed screw 4 and the anti-rotation bars 7.

With pipe profile is herein intended the peripheral shape of the pipe. That is, the shape of the pipe as seen in a cross-sectional view from one end of the pipe. Common pipe profiles are such profiles as square shaped profiles, circular profiles and elliptical profiles, etc. The proposed technology will combine pipe profiles in order to obtain a total pipe profile that is asymmetric, i.e., a cross-sectional representation of the total pipe profile will not be rotational invariant. The pipe profile P1 should, as was mentioned above, be selected so as to enable the outer edges of the feed-screw 4 to reach any material that may overlie the dewatering holes in order to remove, e.g., scrape or push the material away from the dewatering holes. How close the outer edges of the feed-screw needs to be to the dewatering holes to enable the removal of material from the dewatering hole depends on the particular operational mode used when using the screw feeder. If, for example, the rotational speed of the feed-screw is large there might be a larger distance between the outer edges of the feed screw 4 and the dewatering holes than in the case with a slower rotational speed. The latter case may call for a smaller spacing between the dewatering holes and the outer edges of the feed screw 4. The distance between the dewatering holes and the outer edges of the feed screw 4 may for example be selected to lie in the interval [5 mm, 0.1 mm]. The specific distance may however be determined based on the particular operation mode of the screw feeder. The anti-rotation bars and the pipe are preferably a one-piece structure, i.e., they are integrally formed or molded. This single pipe construction provides enough robustness to withstand the stresses and strains that follows from a rotational speed that is high enough to separate water from e.g., wood chips. The one piece structure would thus provide a pipe comprising both anti-rotation bars and de-watering holes.

The shape of the second pipe profile P2 is to be selected so as to prohibit any contact between the outer edges of the feed screw 4 and the anti-rotation bars 7. The gap, or distance, between the outer edges of the feed screw 4 and the anti-rotation bars 7 should preferably be as small as possible given the operation mode of the screw feeder. If the screw feeder is used with a large rotational speed the gap or distance between the outer edges of the feed screw 4 and the anti-rotation bars 7 should preferably be larger than in the operational mode where the rotation speed is smaller. The larger rotational speed may cause a lot of vibrations which should be taken into consideration when determining the gap. The particular distance should in any case be selected to keep as tight a gap as possible while also prohibiting any detrimental contact between the bars and the outer edges. The distance may for example be selected to lie in the interval [5 mm, 0.1 mm]. The specific distance may however be determined based on the particular operation mode of the screw feeder. The proposed technology thus provides screw feeder according to the earlier described embodiments where the shape of the first pipe profile P1 is selected so that the distance between the dewatering holes and the outer edges of the feed screw 4 lie in the interval [5 mm, 0.1 mm].

Figure 3:
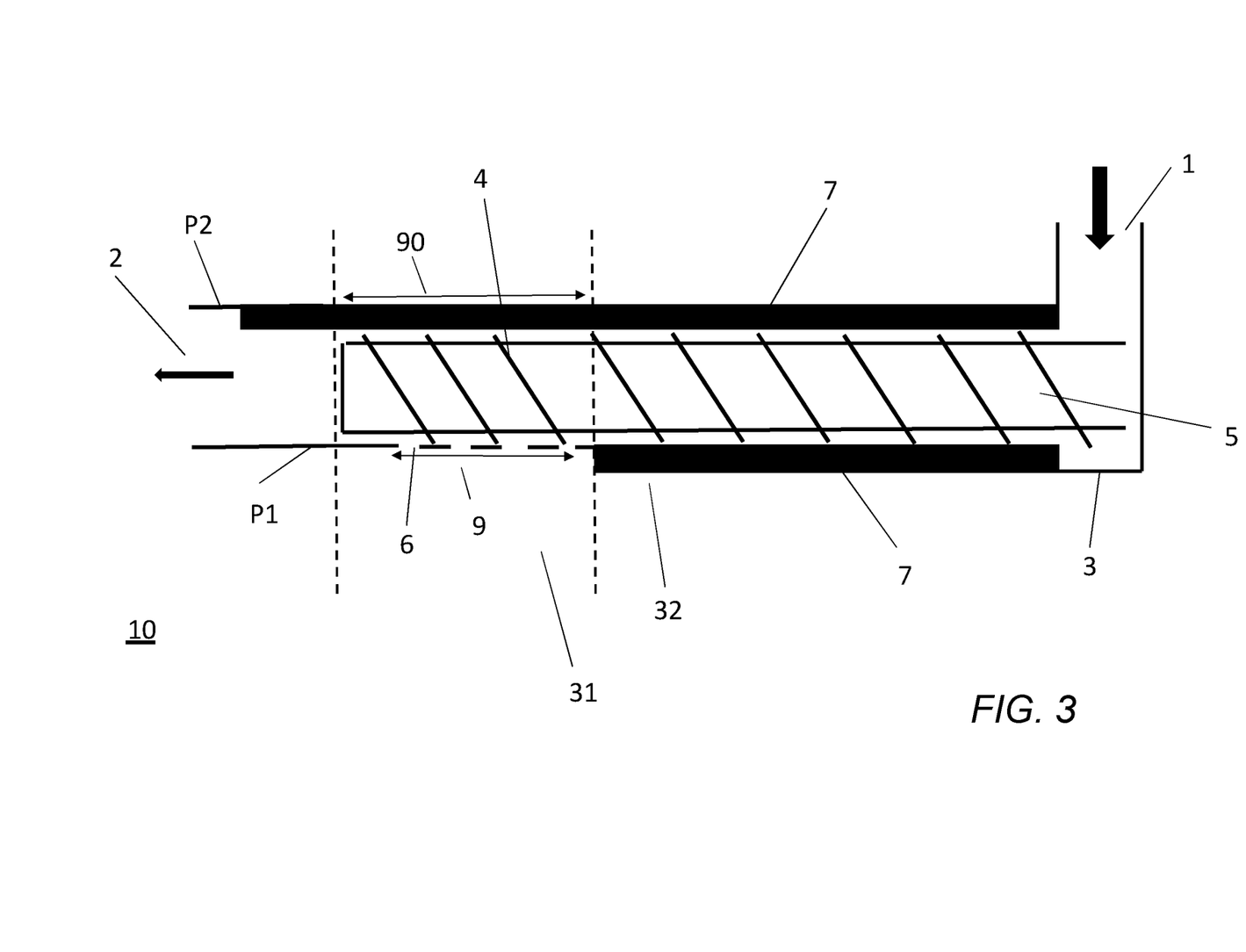
FIG. 3 is a schematic illustration a side view of a screw feeder according to the proposed technology.

FIG. 3 provides a schematic illustration of a screw feeder according to the proposed technology. In FIG. 3 there is illustrated a pipe 3 that is enclosing a rotatory shaft 5 that is arranged centrally in the pipe 3. The rotatory shaft 5 is provided a feed screw 4. One of the ends of the shaft 5, is adapted to be connected to an external drive, e.g., an electrical motor 8, in order to rotate the shaft and thus the feed screw 4. The pipe 3 is also provided with a number of anti-rotation bars 7 that are arranged on, and extending along, the inside of the pipe 3 in such a way that the anti-rotation bars 7 protrudes in a direction towards the feed screw 4. The pipe 3 also comprises a longitudinal pipe section 31 that has an asymmetric pipe profile. The anti-rotation bars 7 should, according to the proposed technology, be arranged in a specific designated peripheral zone 90 in the pipe section 31. This zone 90 may take up a substantial part of the periphery of the pipe 3, i.e., it may take up as much as 60-80% of the total circumferential length of the pipe 3. The dewatering holes 6 are instead provided in a designated peripheral dewatering zone 9 in the pipe section 31. The overall, i.e., the total, pipe profile of the pipe section 31 is composed of two differently shaped pipe profiles P1 and P2. The pipe profile P1 determines the shape of the part of the pipe section 31 that comprises the dewatering zone 9, illustrated in the lower part of the pipe section 31 in the drawing, and the pipe profile P2 determines the shape of the part of the pipe section 31 that comprises the anti-rotation bars 7, illustrated in the upper part of the pipe section 31 in the drawing. It is clear from the drawing that the pipe profile P1 selected for the part containing the peripheral dewatering zone 90 ensures that there is a short distance between the outer edges of the feed screw 4 and the inside surface of the pipe that is provided with dewatering holes. It is also clear from the drawing that the pipe profile P2 selected for the part of the pipe section that comprises the anti-rotation bars 7 ensures that there is no contact between the outer edges of the feed screw and the anti-rotation bars 7.

When a screw feeder 10 as illustrated in FIG. 3 is used, a solid-liquid mixture will be fed into the pipe 3 at inlet 1. The rotation of the rotatory shaft 5 will rotate the feed screw 4 and this rotation will in turn feed the mixture forward. The anti-rotation bars 7 will prohibit the mixture from rotating along with the feed-screw 4, thereby mainly translating the mixture forward. Note that the part of the pipe 3 that is closest to the inlet, i.e., the part of the pipe 3 that is not pipe section 31, may be provided with anti-rotation bars 7 that are evenly distributed on the inside surface of the pipe 3 since this part of the pipe 3 could be a symmetrical pipe, e.g., a pipe with a circular cross-section. At a particular longitudinal region along the pipe the symmetrical pipe 3 goes over into the asymmetrical pipe section 31. The different profiles P1 and P2 that are used for pipe section 31 will now ascertain that any liquid that has been separated from the solid-liquid mixture can be swiftly evacuated from the pipe 3 through the dewatering holes. If the part of the pipe 3 that is closest to the inlet, i.e., the part of the pipe 3 that is not pipe section 31, is provided with anti-rotation bars 7 that are evenly distributed on the inside surface of the pipe 3 some anti-rotation bars 7, the ones that would extend into the dewatering zone 9, needs to be shortened or removed to ensure that they is not brought in contact with the outer edges of the feed screw 4.

There are a number of possible pipe profiles that can be used in the pipe section 31 to obtain the wanted features of enabling a short distance between the outer edges of the feed screw and the dewatering holes and prohibiting a contact between the outer edges of the feed screw and the anti-rotation bars. Below we will provide a few examples of possible shapes.

Figure 4A:
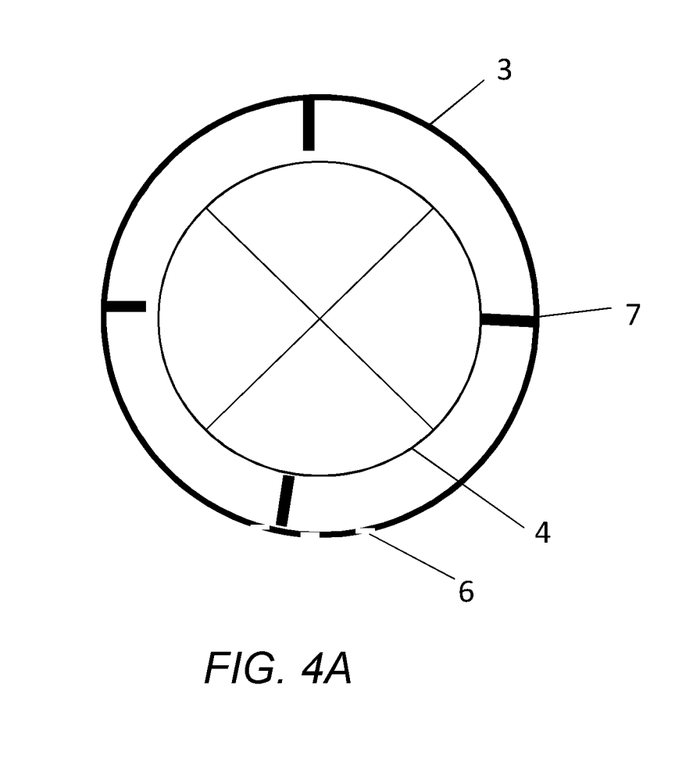
FIG. 4A is a schematic illustration of the cross-section of a pipe in a known screw feeder.
Figure 4B:
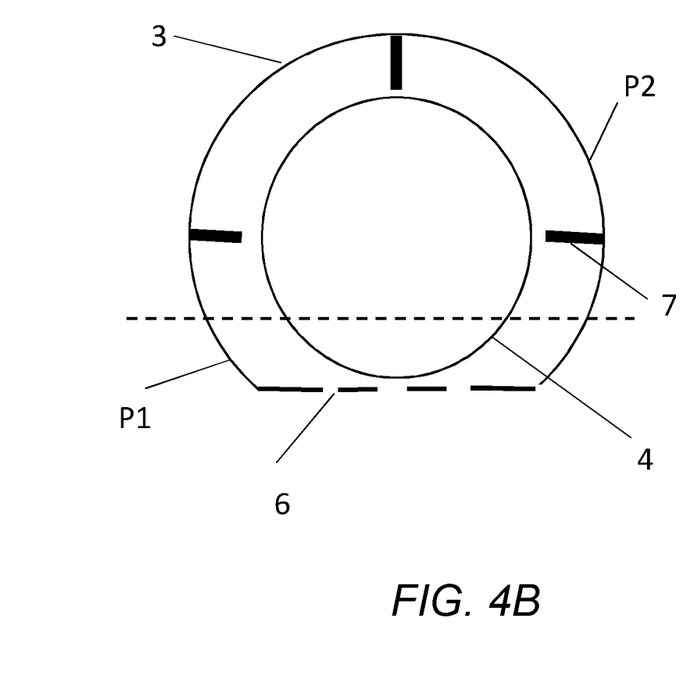
FIG. 4B is a schematic illustration of the cross-section of a pipe in a screw feeder according to an embodiment of the proposed technology.
Figure 5A:
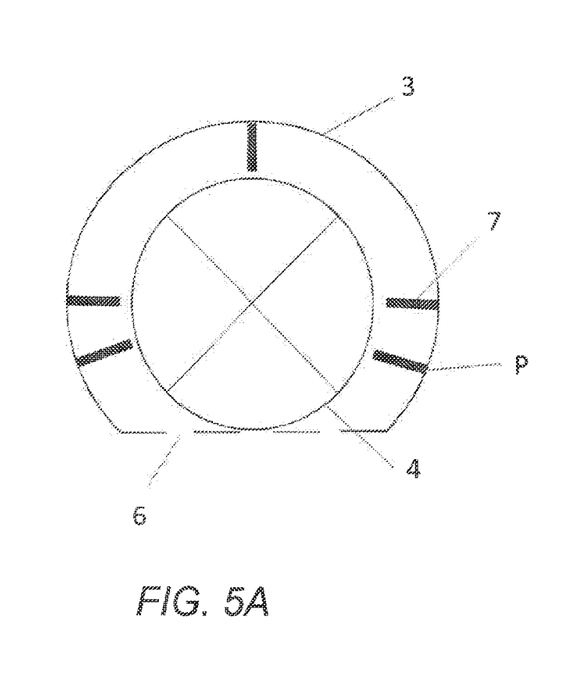
FIG. 5A is a schematic illustration of the cross-section of a pipe in a screw feeder according to an embodiment of the proposed technology.
Figure 5B:
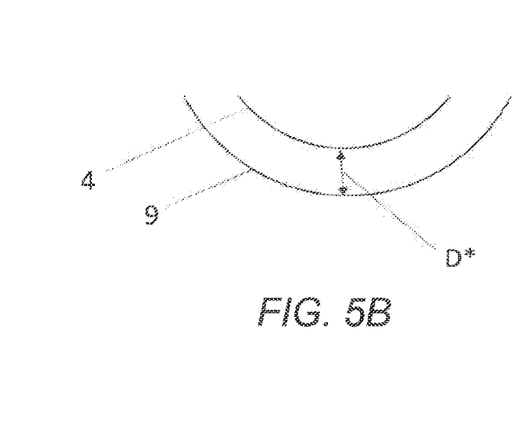
FIGS. 5B and 5C illustrates schematically the differences in distance between the outer end of the feed screw and the inside surface of the pipe in cases with a circular pipe, as illustrated in FIG. 5B, and a circular pipe with a flattened dewatering section, as illustrated in FIG. 5C.

According to a particular embodiment of the proposed technology there is provided a screw feeder, wherein the first pipe profile P1, that defines the shape of the first peripheral zone 9, is a profile having a circular cross-section with a circle segment removed. This embodiment is schematically illustrated in FIGS. 4B and 5A.

According to another particular embodiment of the proposed technology there is provided a screw feeder 10 wherein the first pipe profile P1 is a square shaped profile. The overall, or total, pipe profile of the pipe section 31 could in this case be seen as a combination of e.g., a circular profile, corresponding to profile P2, and a square shaped pipe profile P1. The profiles P1 and P1 will smoothly connect at two points along the periphery of the pipe.

According to another embodiment of the proposed technology there is provided a screw feeder 10 wherein the first pipe profile P1 is a partly circularly shaped profile having a squashed lower vertical part or a removed lower vertical part, i.e., having a partly circular cross-section but with a circle segment removed. An example of such a profile is illustrated in FIG. 4B. FIG. 4B illustrates a cross-sectional view of an embodiment where the pipe profile P2 for zone containing the anti-rotation bars has the shape of circle arc and the pipe profile P1 has the shape of a circle with a segment removed in order to reduce the distance to the dewatering holes 6. The overall, or total, pipe profile of the pipe section 31 could in this case be seen as a combination of e.g., a circular profile, corresponding to profile P2, and a partly circularly shaped pipe profile P1. The profiles P1 and P1 will smoothly connect at two points along the periphery of the pipe. The embodiment of FIG. 4B may be contrasted with the pipe illustrated in FIG. 4A. FIG. 4A illustrates a known pipe for a screw feeder where the anti-rotation bars 7 are provided symmetrically around the whole inner surface of the pipe. That is, even in the peripheral zone where the dewatering holes are provided.

Figure 5C:
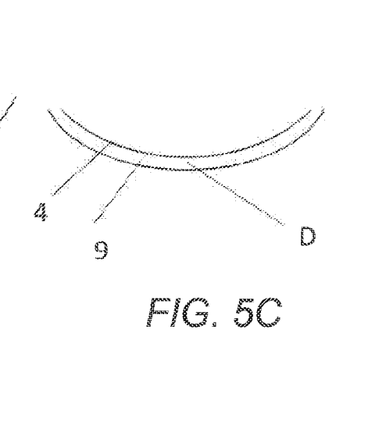

Still another embodiment of the proposed technology provides a screw feeder 10 wherein the first pipe profile P1 is a partly elliptically shaped profile. The overall, or total, pipe profile of the pipe section 31 could in this case be seen as a combination of e.g., a circular profile, corresponding to profile P2, and a partly elliptically shaped pipe profile P1. The profiles P1 and P1 will smoothly connect at two points along the periphery of the pipe. A cross-sectional view of an elliptically shaped pipe profile is illustrated in FIG. 5C. FIG. 5C illustrates the reduced distance D between the outer edges of the feed screw 4 and peripheral zone 9 that contains the dewatering holes 6 that can be obtained if a partly elliptically shape pipe profile P1 is used. Comparison can be made with the configuration shown in FIG. 5A where the pipe profile P1 has the same symmetry as circle arc. The distance D* between the outer edges of the feed screw 4 and peripheral zone 9 that contains the dewatering holes 6 is a bigger compared to the distance D in FIG. 5C.

According to a particular embodiment of the proposed technology there is provided a screw feeder, wherein the first peripheral zone 9, comprising the dewatering holes 6, is provided in the vertically lower area of the longitudinal pipe section 31 and the second peripheral zone 90, comprising the anti-rotation bars, is provided in the vertically upper area of the longitudinal pipe section 3. Such an embodiment is illustrated in FIG. 3.

By way of example, the proposed technology provides a screw feeder 10, wherein the pipe section 31, at an end farthest from the outlet 2, connects to a second pipe section 32, the second pipe section 32 having an essentially circular pipe profile.

A particular example of this embodiment is illustrated in FIG. 3 where there is shown how the pipe section 31 connects, at the dashed line closest to the inlet 1, to a pipe section 32. The pipe section 31 may comprise a pipe having a symmetrical cross-section, e.g., a circular cross-section. The pipe section 32 may also be equipped with anti-rotation bars 7 that are evenly distributed along the inside surface of the pipe section 32. The pipe section 32 may also be provided with dewatering holes 6, this is however optional.

An exemplary embodiment of the proposed technology provides a screw-feeder 10, wherein the outlet 2 is arranged to discharge the at least partially de-liquified material from the pipe in a direction that is essentially parallel with the feeding direction of the feed screw 4. This particular embodiment is particularly beneficial if the proposed technology for example is implemented in a plug screw feeder. Details regarding a plug screw feeder will be provided later in this application.

Specific embodiments of the proposed technology provides a screw feeder 10, wherein the rotatory shaft 5 is connectable to an electrical motor 8 that is adapted to generate a rotation of the rotatory shaft 5.

Still another specific embodiment of the proposed technology provides a screw feeder 10, wherein the pipe 3 is adapted to be connected to a pump 12 in order to pressurize the interior of the pipe 3. This embodiment may be particularly beneficial if the proposed technology for example is implemented in a plug screw feeder. Details regarding a plug screw feeder will be provided below.

Having described embodiments of a general screw feeder, in what follows we will provide details of a particularly suitable screw feeder in which the proposed technology may be implemented. Such a screw feeder to as a plug screw feeder and it has the feature that the pipe 3 and the feed-screw 4 are conically shaped in the longitudinal direction extending from the inlet 1 to the outlet 2, where the most tapered part of the pipe connects to the outlet 2.

Figure 6:
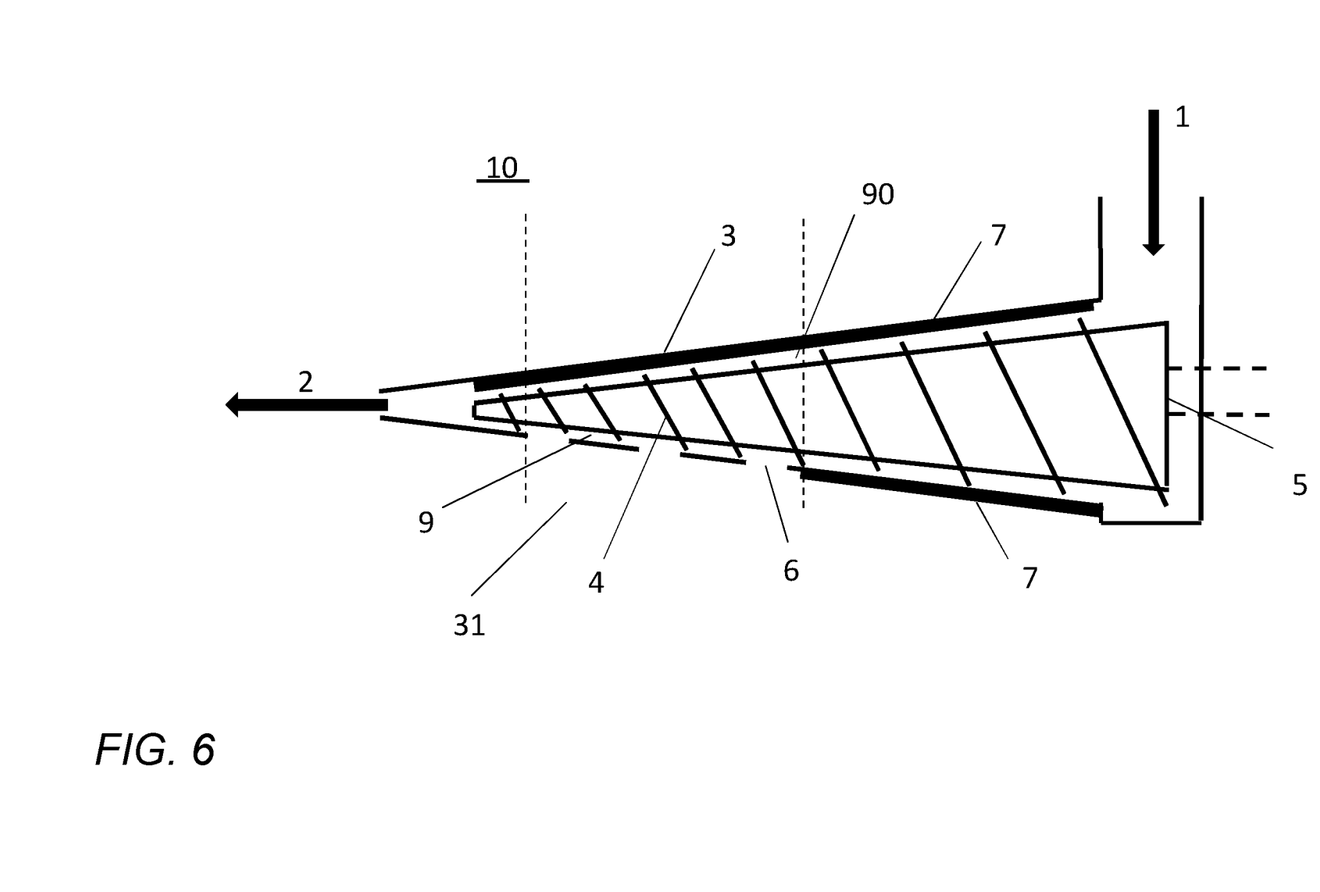
FIG. 6 is a schematic illustration of a side view of a particular embodiment of the proposed technology where the pipe and the feed screw have a conically shaped length direction. Such an embodiment is referred to as a plug screw feeder.
Figure 7:
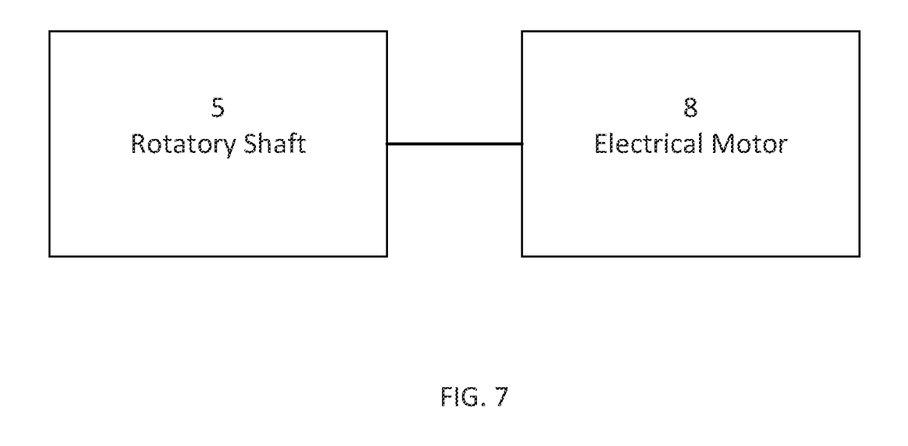
FIG. 7 is a box diagram of the connection between the rotatory shaft and the electrical motor.
Figure 8:
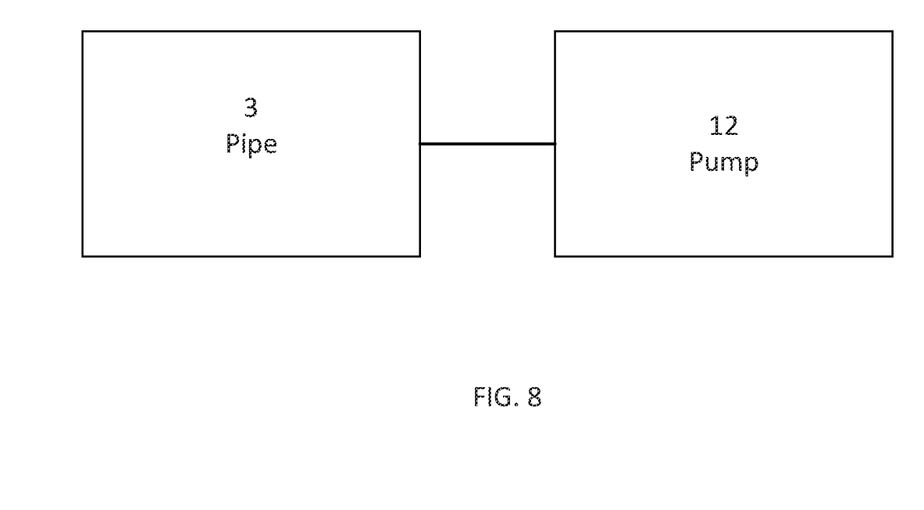
FIG. 8 is a box diagram of the connection between the rotatory shaft and the pump.

To further describe a plug screw feeder reference is made to FIG. 6. FIG. 6 illustrates a plug screw feeder 10 having a pipe 3 that connects an inlet 1 to an inlet 2. The inlet 1 is arranged at a first end of the pipe 3 and is adapted to receive a solid-liquid mixture arranged at a first end of the pipe 3. The outlet 2 is arranged at a second opposite end of the pipe 3 and is adapted for discharging an at least partially de-liquefied solid from the pipe 3. Arranged centrally in the pipe 3 is a rotatory shaft 5, which is connectable to an external drive for imparting a rotation of the rotatory shaft, provided with a feed screw 4. The pipe 3 further comprising a number of dewatering holes 6. The pipe 3 is also provided with a number of anti-rotation bars 7 that arranged on, and extending along, the inside of the pipe 3. The anti-rotation bars 7 protrudes in a direction towards the feed screw 4. The pipe 3 includes at least one longitudinal pipe section 31, illustrated by means of dashed lines, having a first peripheral zone 9 that is provided with dewatering holes 6 but no anti-rotation bars 7 and a second peripheral zone 90 that is provided with anti-rotation bars 7. The overall pipe profile of the pipe section 31 is composed of two differently shaped pipe profiles, a first pipe profile P1 and a second pipe profile P2, the first pipe profile P1 defining the shape of the first peripheral zone 9 and the second pipe profile P2 defining the shape of the second peripheral zone 90. The shape of the first pipe profile P2 is selected so as to allow the outer edges of the feed screw 4 to extend close enough to the dewatering holes 6 to allow the outer edges to remove material overlying the dewatering holes 6, and the shape of the second pipe profile P2 is selected so as to prohibit any contact between the outer edges of the feed screw 4 and the anti-rotation bars 7. The only difference between a specific plug screw feeder and the earlier described general screw feeder 10 is that the plug screw feeder 10 have a pipe 3 and feed screw 4 that are conically shaped in their longitudinal directions. All other earlier described features and embodiments of the proposed technology can be implemented in a plug screw feeder without any alterations beside the necessary adaptions to the geometry of the pipe and feed screw. Note that the conical tapering of the plug screw in FIG. 6 is highly exaggerated. The degree of tapering is normally much smaller.

The proposed technology also provides a particularly shaped pipe 3 that is suitable to use with a screw-feeder to improve the dewatering efficiency and reduce the risk that the material in a solid-water mixture co-rotates with the feed-screw. To this end there is provided a pipe 3 that is adapted to enclose a feed screw 4 arranged on a rotatory shaft 5 running parallel with the length direction of the pipe 3. The pipe 3 comprises an inlet 1 for receiving a solid-liquid mixture and an outlet 2 arranged at an opposite end of the pipe relative the inlet for discharging an at least partially dewatered solid from the pipe 3. The pipe 3 comprises at least one longitudinal pipe section 31 having a first peripheral zone 9 provided with dewatering holes 6 and a second peripheral zone 90 provided with anti-rotation bars 7. The overall pipe profile of the pipe section 31 being composed of two differently shaped pipe profiles, a first pipe profile P1 and a second pipe profile P2, the first pipe profile P1 defining the shape of the first peripheral zone 9 and the second pipe profile P2 defining the shape of the second peripheral zone 90. The shape of the first pipe profile P2 is selected so as to allow the outer edges of the feed screw 4 enclosed by the pipe 3 to extend close enough to the dewatering holes 6 to allow the outer edges to remove material overlying the dewatering holes 6, and the shape of the second pipe profile P2 is selected so as to prohibit any contact between the outer edges of the feed screw 4 and the anti-rotation bars 7.

The proposed technology thus provides a pipe 3 to be used in a screw-feeder 10 according to the earlier described embodiments. The pipe 3 comprises an inlet 1 for receiving a solid-liquid mixture and an outlet 2 arranged at an opposite end of the pipe, relative the inlet 1, for discharging an at least partially dewatered solid from the pipe 3. The pipe 3 further comprises at least one longitudinal pipe section 31 having a first peripheral zone 9 provided with dewatering holes 6 and a second peripheral zone 90 provided with anti-rotation bars 7, the overall pipe profile of the pipe section 31 being composed of two differently shaped pipe profiles, a first pipe profile P1 and a second pipe profile P2, the first pipe profile P1 defining the shape of the first peripheral zone 9 and the second pipe profile P2 defining the shape of the second peripheral zone 90. The shape of the first pipe profile P1 is selected from a square shaped profile or a profile having a partly circular cross-section with a squashed end or a circle segment removed whereas the shape of the second pipe profile P2 is a circularly shaped pipe profile.

A particular benefit achieved with such a pipe is that it allows a screw-feeder to be easily equipped with a particular pipe having specific dimensions and shapes that are suitable for a specific operational mode, e.g, suitable to use with either high rotational speed or low rotational speed, or in e.g., a highly pressurized environment.

According to a particular embodiment of such a pipe there is provided a pipe 3 that further comprises a second pipe section 32 having an essentially circular pipe profile, and wherein the pipe section 31, at an end farthest from the outlet 2, connects to the second pipe section 32.

According to still another embodiment there is provided a pipe 3, wherein the first pipe profile P1 is a profile selected from, a square shaped profile, a partly circularly shaped profile with a squashed end or with a circle segment removed or a partly elliptically shaped profile.

According to yet another embodiment of the proposed pipe there is provided a pipe 3, wherein the second pipe profile P2 is a circularly shaped pipe profile.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The invention claimed is:

1. A screw feeder comprising:
a pipe enclosing a feed screw provided on a rotatory shaft running parallel with a length direction of the pipe, said pipe further comprising a plurality of dewatering holes;
a plurality of anti-rotation bars provided on, and extending along, an inside of said pipe, said anti-rotation bars protruding in a direction towards said feed screw;
an inlet arranged at a first end of said pipe and configured to receive a solid liquid mixture; and
an outlet arranged at a second end of said pipe and configured to discharge an at least partially dewatered solid from said pipe, wherein:
said pipe comprises at least one longitudinal pipe section having a first peripheral zone provided in a vertically lower area of said longitudinal pipe section and provided with dewatering holes but no anti-rotation bars, and a second peripheral zone provided in a vertically upper area of said longitudinal pipe section provided with said anti-rotation bars, wherein an overall pipe profile of said longitudinal pipe section includes two differently shaped pipe profiles, a first pipe profile and a second pipe profile,
said first pipe profile defines a shape of the first peripheral zone and is:
a square-shaped profile,
a profile having a partly circular cross-section with a squashed end or a circle segment removed, or
a partly elliptically-shaped profile; and
said second pipe profile defines a shape of the second peripheral zone;
the shape of said first pipe profile is selected to enable outer edges of said feed screw to remove material overlying said dewatering holes; and
the shape of said second pipe profile is selected so as to prohibit any contact between said outer edges of said feed screw and the anti-rotation bars.

2. The screw feeder according to claim 1, wherein said second pipe profile is a circularly-shaped pipe profile.

3. The screw feeder according to claim 1, wherein said first pipe profile defining the shape of the first peripheral zone is a profile having a circular cross-section with a circle segment removed.

4. The screw feeder according to claim 1, wherein the shape of said first pipe profile is selected so that a distance between the dewatering holes and the outer edges of the feed screw lies in a range of 0.1 mm to 5 mm.

5. The screw feeder according to claim 1, wherein said longitudinal pipe section, at an end farthest from said outlet, connects to a second pipe section, said second pipe section having an essentially circular pipe profile.

6. The screw-feeder according to claim 1, wherein said outlet is configured to discharge said at least partially dewatered solid from the pipe in a direction that is essentially parallel with a feeding direction of said feed screw.

7. The screw feeder according to claim 1, wherein said rotatory shaft is connectable to an electrical motor that is configured to generate rotation of said rotatory shaft.

8. The screw feeder according to claim 1, wherein said screw feeder is a plug screw feeder, said pipe and said feed-screw are conically shaped in a longitudinal direction extending from the inlet to the outlet, and a most tapered part of the pipe connects to the outlet.

9. The screw feeder according to claim 1, wherein said pipe is configured to be connected to a pump that is configured to pressurize the interior of said pipe.

\* \* \* \* \*